United States Patent [19]

Stursa et al.

[11] 4,338,710
[45] Jul. 13, 1982

[54] APPARATUS FOR FORMING BORES

[76] Inventors: Ken V. Stursa, 4895 Futura St., Eugene, Oreg. 97404; Amos A. Horner, Star Rte., Box 92, Cascadia, Oreg. 97329

[21] Appl. No.: 122,982

[22] Filed: Feb. 20, 1980

[51] Int. Cl.³ .............................................. B23B 47/18
[52] U.S. Cl. .................................... 29/26 A; 408/49; 408/50; 408/52
[58] Field of Search .................... 29/26 A; 408/49, 50, 408/52, 51, 42; 198/434; 144/242 R

[56] References Cited

U.S. PATENT DOCUMENTS

| | | | |
|---|---|---|---|
| 1,710,744 | 4/1929 | Roe | 408/52 |
| 2,070,466 | 2/1937 | Carpenter | 408/50 |
| 2,323,694 | 7/1943 | Ward et al. | 408/50 X |
| 2,535,670 | 12/1950 | Croft, Sr. | 408/49 X |
| 2,830,692 | 4/1958 | Winkel | 198/434 |
| 3,045,803 | 7/1962 | Bruce | 198/434 |
| 3,109,531 | 11/1963 | Jackson | 198/434 |
| 3,452,792 | 7/1969 | Foreman | 408/50 |
| 3,580,309 | 5/1971 | Hochstetler | 408/50 X |
| 3,767,314 | 10/1973 | Wirch | 408/50 |
| 3,977,804 | 8/1976 | Kitagawa | 408/50 X |

FOREIGN PATENT DOCUMENTS 2054807 5/1972 Fed. Rep. of Germany ...... 198/434
26988 11/1954 Finland ............................. 198/434

Primary Examiner—William R. Briggs
Attorney, Agent, or Firm—Kolisch, Hartwell & Dickinson

[57] ABSTRACT

An apparatus is disclosed for forming bores in articles, such as lumber studs which includes a conveyor operable for transporting the studs to a work station. Disposed adjacent the work station is a charging mechanism operable for isolating a predetermined course of the studs from the conveyor at the work station and maintaining the course substantially stationary. Drill sets are mounted on the charger and beneath the course and are operable for selectively shifting vertically upwardly for drilling bores in the course. The charger includes a carriage assembly which is disposed beneath the conveyor selectively operable for reciprocal vertical shifting to lift the course from the conveyor and return the course thereto. The drills are rigidly mounted on the carriage assembly and are moveable therewith. Additionally, the carriage assembly is provided with a lift element which is mounted thereon by means of a resilient mounting. The upper surface of the lift element is normally biased above the penetrating ends of the drills.

10 Claims, 5 Drawing Figures

APPARATUS FOR FORMING BORES

BACKGROUND AND SUMMARY OF THE INVENTION

The present invention relates to apparatus for the working of articles, and more particularly to a novel method and apparatus for forming recesses or bores in articles, such as sticks of lumber.

In the building construction industry, it has been found particularly advantageous to provide bores in sticks of lumber, such as studs which are to be used for stud walls. Generally, it has been the practice to initially erect stud walls for a home or building and then drill holes or bores in the studs to accommodate electrical wiring, piping, etc. However, it is a time-consuming proposition to drill bores in the studs on a jobsite. Therefore, it has become apparent that a significant advantage would be to predrill bores in the studs prior to erection thereof. Such predrilling would most expeditiously be achieved at lumber mills producing the studs, but there are significant problems which must be overcome in order to provide a method and apparatus for predrilling studs which will not interfere with line production of lumber.

Accordingly, it is a general object of the present invention to provide a method and apparatus for simultaneously forming bores in articles, such as elongate sticks of lumber or studs which may be readily provided in a mill production line. More particularly, it is an object of the present invention to provide an apparatus including a conveying means, positioned downstream of, for example, trimmer saws, which is operable for transporting the studs to a drilling or work station. Disposed adjacent the work station, in accordance with the present invention, is a charging means operable for isolating a predetermined batch or course of the studs from the conveying means and maintaining the studs substantially stationary. Drilling means are suitably mounted on the charging means and beneath the course operable for selective shifting vertically upwardly for simultaneously drilling bores in each article of the course from the bottom surfaces thereof.

Another object of the present invention is to provide an apparatus, as described above, in which the charging means cooperates with a stabilizing means, such as an overhead hold down member disposed above the conveying means. More particularly, the charging means includes a lift means selectively operable for engaging and shifting the course upwardly from the conveying means and urging the course against the overhead hold down member to thereby clamp the course thereagainst. The lift means is incorporated within a carriage assembly which is selectively operable for reciprocal vertical shifting to lift the course from the conveying means and to also return the course thereto. The drilling means is rigidly mounted on the carriage assembly and movable therewith. Thus, when the course is clamped against the overhead hold down member, the drilling means may be further shifted during vertical movement of the carriage assembly for drilling bores into the course.

Still another object of the present invention is to provide a carriage assembly which includes a lift element and mounting means for connecting the lift element to the carriage assembly. The mounting means includes resilient means, such as air bags, which are interposed between the life element and the carriage assembly to enable the lift element to be raised, upon upward shifting of the carriage assembly, to a position whereby the lift element initially engages the course and continuously clamps it against the overhead member while simultaneously permitting subsequent relative shifting of the carriage assembly so that the drilling means engages and drills bores into the articles. The air bags, being compressible, permit the lift element to clamp the course against the overhead hold down member while permitting subsequent upward movement of the drilling means.

Thus, it can be appreciated that the apparatus of the present invention provides a method for forming bores in articles which includes grouping a predetermined batch or course of the articles and shifting the course vertically upwardly against an overhead stabilizing means to permit boring of the articles.

These and additional objects and advantages of the present invention will be more readily understood after a consideration of the drawings and the following detailed description of the preferred embodiment.

DETAILED DESCRIPTION OF THE PREFERRED EMBODIMENT

As mentioned previously, the present invention is directed to a method and apparatus for simultaneously predrilling elongate articles, such as lumber studs at preselected locations on the studs. For instance, it may be desired to drill bores adjacent opposite ends of each stud, and to this end, the present invention contemplates the provision of an apparatus having a pair of work stations which receive the studs and at which there is imparted the necessary drilling action. To this end, the present invention includes a frame construction which may be positioned downstream of trimmer saws. The frame construction includes a conveying means operable for transporting the studs to the work stations. A charging means, which includes a carriage assembly provided with drilling means, is operable for isolating a predetermined course of the studs from the conveying means at the work stations and maintaining the course substantially stationary. This is accomplished by vertically upward shifting of the carriage assembly so that a lift means provided thereon engages bottom surfaces of the studs and shifts them upwardly against an overhead stabilizing means. Continued upward shifting of the carriage assembly urges the drilling means into contact with the studs for drilling bores upwardly into the studs.

Figure 1:
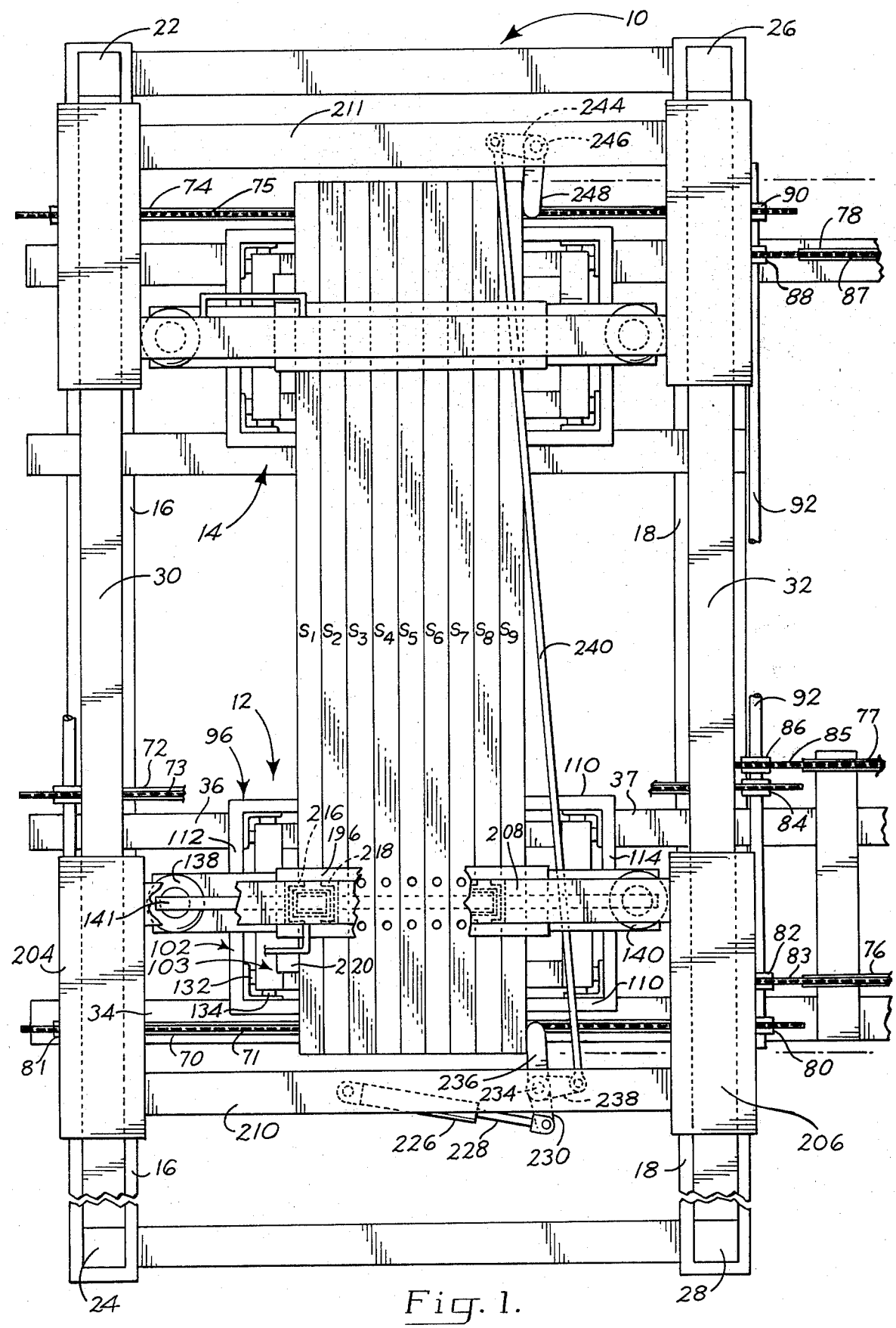
FIG. 1 is a top plan view of an apparatus according to the present invention illustrating batching or grouping of nine studs in order to predrill same at locations adjacent opposite ends of each stud.

With the above overview in mind, attention is now directed to FIG. 1 of the drawings which illustrates, in a top plan view, apparatus according to the present invention generally designated at 10. The apparatus includes a pair of work stations, generally designated at 12, 14 each of which is situated on a common frame structure. Describing the frame structure, reference is also directed to FIG. 2 which illustrates a pair of laterally opposed elongate beams 16, 18 which are suitably disposed on a floor 20. Mounted on opposite ends of each beam are vertically extending upright posts, such as posts 22, 24 on beam 16 and posts 26, 28 on beam 18 (FIG. 1). Spanning between posts 22, 24 adjacent upper portions thereof is a laterally extending beam 30 which is positioned above beam 16 with its longitudinal axis substantially parallel to the longitudinal axis of beam 16. Additionally, another beam 32 interconnects posts 26, 28 adjacent upper portions thereof and is positioned with its longitudinal axis substantially parallel to beam 18. The function of laterally extending beams 30, 32 will be described at a later point.

Figure 3:
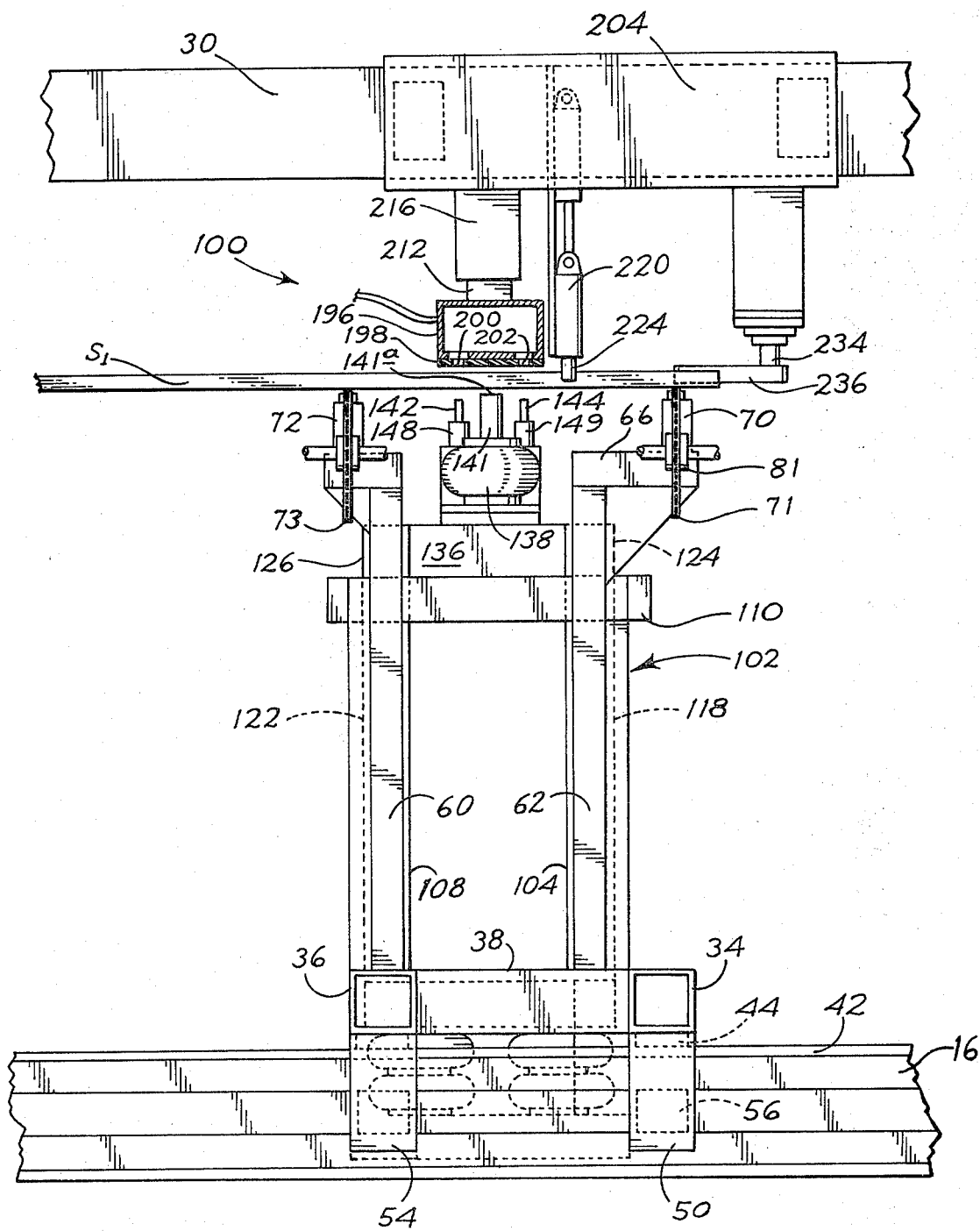
FIG. 3 is an end view of a portion of the apparatus, looking in from the left of FIG. 1 and illustrates details of a shiftable carriage assembly including drilling means for drilling bores in the studs.

Turning now to details of the work stations, attention is initially directed to work station 12 illustrated near the bottom of FIG. 1 (work station 14 being similar) which includes an assembly mounted on the frame structure operable for receiving studs from a conveying means and simultaneously drilling bores adjacent one end of each stud. The assembly includes supporting elongate members 34, 36 and 37 which are dimensioned to span between beams 16, 18. Elongate members 34, 36 can also be seen from a viewing of FIG. 3 and are rigidly interconnected by transversely extending cross beams 38, 40. Additionally, it is to be noted that the elongate members are mounted for slidable movement, as a unit, on support beams 16, 18 by means of slide bearings. More particularly, support beam 16 is provided with a continuous stretch of low-friction material 42 which slidably contacts similar material, such as indicated at 44 provided on elongate member 34. Further, as can be seen in FIG. 3, low-friction material 44 is mounted on an underside of elongate member 36.

Similarly, support beam 18 is provided with a continuous stretch of low-friction material 48 which slidably engages low-friction material mounted on elongate members 34, 37. Considering now a means for maintaining the position of elongate members 34, 36 and 37 along support beams 16, 18, it can be seen from a viewing of FIG. 2 that positioning members 50, 52 are mounted on elongate member 34 in a depending manner so as to overlap sides of support beam 16. Positioning members are mounted so as to depend from elongate member 36, such as positioning member 54 shown in FIG. 3. Each positioning member is provided with low-friction material which slidably engages a stretch of similar material mounted on support beam 16. For instance, support beam 16 is provided with such material indicated at 56, 58. The positioning members prevent shifting of elongate members 34, 36 and 37 in a direction perpendicular to the longitudinal axes of support beams 16, 18.

Turning now to the provision of a conveying means for transporting lumber such as studs from trimmer saws, it can be seen that elongate members 34, 36 and 37 define a supporting base for a conveyor supporting structure. Explaining further, and as can be seen from a consideration of FIG. 3, uprights 60, 62 are mounted on elongate member 36 and cross-beam 38 respectively. Similarly, as can be seen from a viewing of FIG. 2, an upright 64 is mounted on cross-beam 40 and another upright (not shown) is mounted behind upright 64 and spaced therefrom on elongate member 37. Each upright supports a mounting bracket for holding a chain race. For instance, upright 62 is provided with a mount 66 and upright 64 is provided with a mount 68. Supported on top of mounts 66, 68 is a chain race 70 which spans between uprights 62, 64. Another chain race 72 (see also FIG. 1) is provided parallel to chair race 70 and is laterally spaced-apart therefrom. Yet another chain race, indicated at 74 is provided adjacent work station 14.

Figure 2:
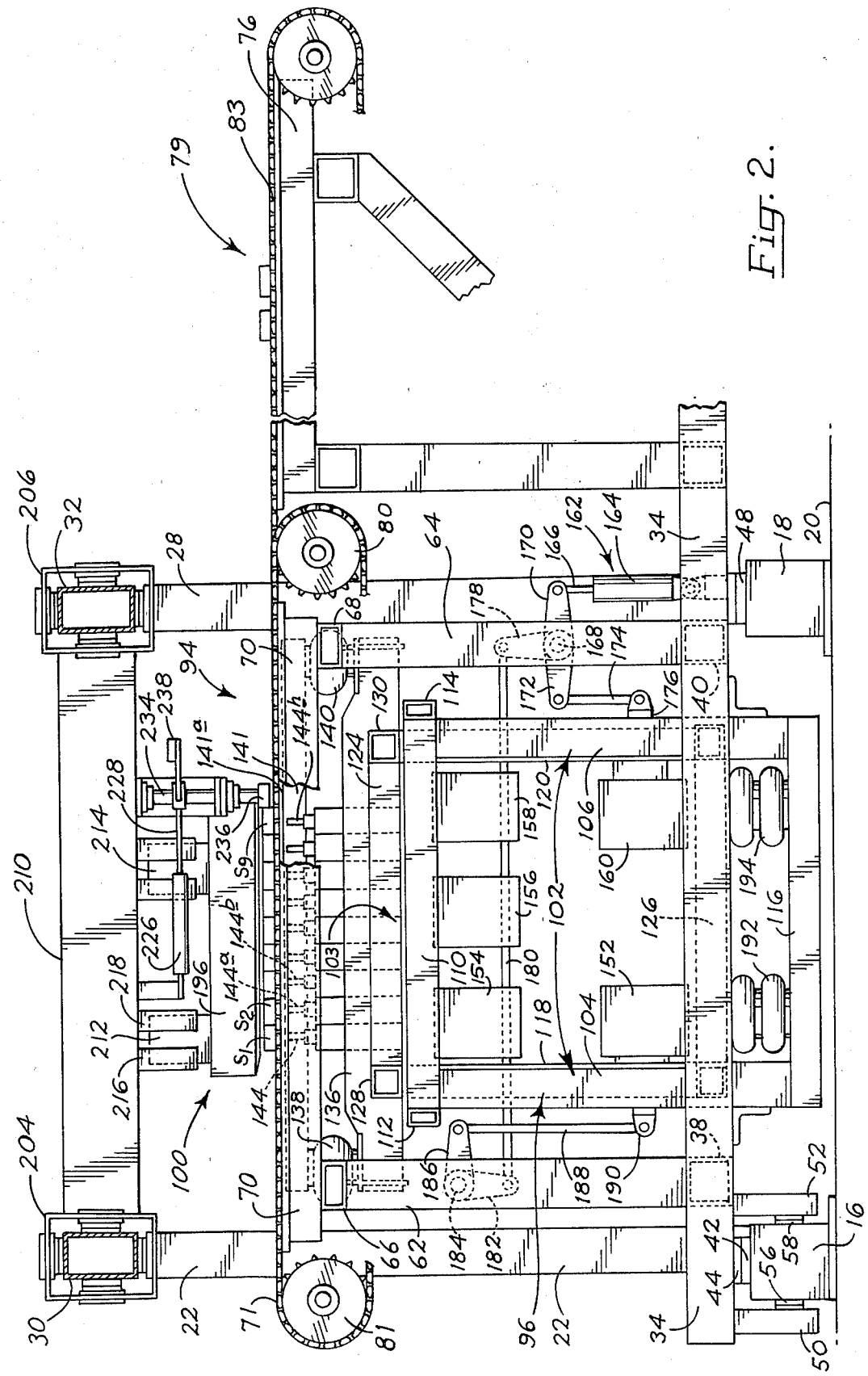
FIG. 2 is a side elevation view of FIG. 1.

It is also to be noted that elongate members 34, 36 and 37 support additional frame members for mounting infeed chain races 76, 77 and 78. These chain races guide a plurality of infeed conveying chains. As shown in FIG. 1, suitable drive sprockets indicated at 80, 82–90 are mounted on a common drive shaft 92. The drive shaft is suitably journaled to the supporting structure in conventional manner. Additionally, each of the drive sprockets are power driven in a conventional manner and are mounted on shaft 92 so that they may be selectively positioned along the longitudinal axis of the drive shaft. Thus, it can be seen that drive sprockets 82, 86 and 88 are operable for driving a set of infeed conveying chains indicated at 83, 85 and 87 in their associated races for transporting studs in a manner which will be described at a later point. For purposes of description, and recognizing that the studs will be transported from right to left, when viewing FIGS. 1 and 2, chains 83, 85 and 87 with their associated drive sprockets and races will be referred to as a first conveying means generally indicated at 79 as shown in FIG. 2. Further, it is to be noted that races 70, 72 and 74 with their associated drive sprockets and conveying chains indicated at 71, 73, and 75 will be referred to as a second conveying means generally indicated at 94. As shown in FIG. 2, sprockets 80, 81 train chain 71 in race 70 and are operable for driving same.

Turning now to a description of the actual mechanism for drilling bores in the studs, reference is now directed to FIGS. 2 and 3. Such mechanism will be hereinafter referred to as a charging means, generally indicated at 96 adjacent work station 2 as illustrated in FIG. 2. A second, similar charging means generally indicated at 98 is provided adjacent work station 14 as shown in FIG. 1. It is deemed necessary only to describe the specific construction and operation of charging means 96 because a similar construction is provided with respect to charging means 98. As shown in FIG. 3, a stabilizing means generally indicated at 100 is provided to cooperate with charging means 96, details of which will be considered further in this description.

Generally, each charging means, such as charging means 96 includes a lift means such as a shiftable carriage assembly selectively operable for shifting from a pre-spot position to an upward position for engaging bottom surfaces of the studs and shifting the studs against stabilizing means 100. Because the carriage assembly includes drilling means, suitable bores are simultaneously drilled into the studs upon further upward shifting of the carriage assembly. To provide such a function, charging means 96 includes a stationary guide assembly within which is slidably mounted a movable internal assembly. Each of the assemblies is formed as a box-like frame. As can be seen from a consideration of FIGS. 1 and 2, a first guide assembly generally designated at 102 includes uprights 104 and 106 which are spaced apart and suitably mounted on elongate member 34. As shown in FIG. 3, an upright 108, opposite to upright 104, is joined to elongate member 36. While not illustrated in FIG. 3, another upright is spaced behind upright 108 and is aligned across from upright 106. Interconnecting a top of uprights 104, 106 and 108 are frame members 110 and transversely extending frame members 112, 114. Additionally, base frame members are provided, one of which is indicated at 116 in FIG. 2. Thus, what has been described so far is first a guide assembly 102 which is rigidly mounted on elongate members 34, 36 and 37 which provides a frame for receiving and guiding a shiftable internal assembly which will be referred to hereinafter as the carriage assembly, generally indicated at 103.

With respect to the construction of the carriage assembly, it is to be appreciated that it includes a box-like frame which is vertically shiftable within the interior of guide assembly 102. More specifically, as can be seen from a consideration of FIG. 2, together with a viewing of FIG. 1, carriage assembly 103 includes four, spaced-apart uprights arranged as a box frame, two of the uprights being shown in FIG. 2 at 118 and 120 and another shown in FIG. 3 at 122. Interconnecting the uprights at their opposite corners are upper and lower cross members, such as indicated at 124, 126 (see also FIG. 3) and transversely extending members 128, 130. The outer periphery of carriage assembly 103 is dimensioned so as to fit within the inside of guide assembly 102, and slide elements (FIG. 1), such as indicated at 132, 134, provided on the carriage assembly slidably contact slide elements provided adjacent the inside corners of guide assembly 102.

Mounted on top of cross members 128, 130 is a beam 136 which is dimensioned to span adjacent uprights 62, 64 as shown in FIG. 2. Beam 136 extends with its longitudinal axis parallel to the direction of transport of the conveying means and is provided with isolating means 138, 140 adjacent its opposite ends. The isolating means may preferably take the form of air bags which envelope a fluid, such as air under pressure, and provide a resilient mounting for a lift element indicated at 141 having an upper or stud-engaging surface 141a. Lift element 141 is an elongate member and is suitably mounted on top of isolating means 138, 140 and is dimensioned with its longitudinal axis substantially parallel to the direction of conveyance of the conveying means. The purpose of the lift element is to initially contact a course of studs on their bottom surfaces and urge them against stabilizing means 100 so that drilling may be provided.

Considering the construction of the drilling means for drilling the bores, attention is not directed to FIGS. 2 and 3. It is assumed that each stud is to be provided with a pair of bores, aligned generally along the longitudinal axis of the stud adjacent each end of the stud. As shown in FIG. 3, a pair of side-by-side positioned and aligned drills 142 and 144 are mounted on carriage assembly 103 with their penetrating ends disposed somewhat beneath upper surface 141a of lift element 141. Each of the drills is mounted in a drill housing, such as housings 148 and 149 provided for drills 142, 144 respectively. Of course, assuming that a course of nine studs are to be drilled, each stud having two bores adjacent its opposite ends, it should be clear that there are eight aligned drills behind drill 142 and eight aligned drills behind drill 144 viewing FIG. 3. As shown in FIG. 2, a last drill is shown at 144.

Figure 4:
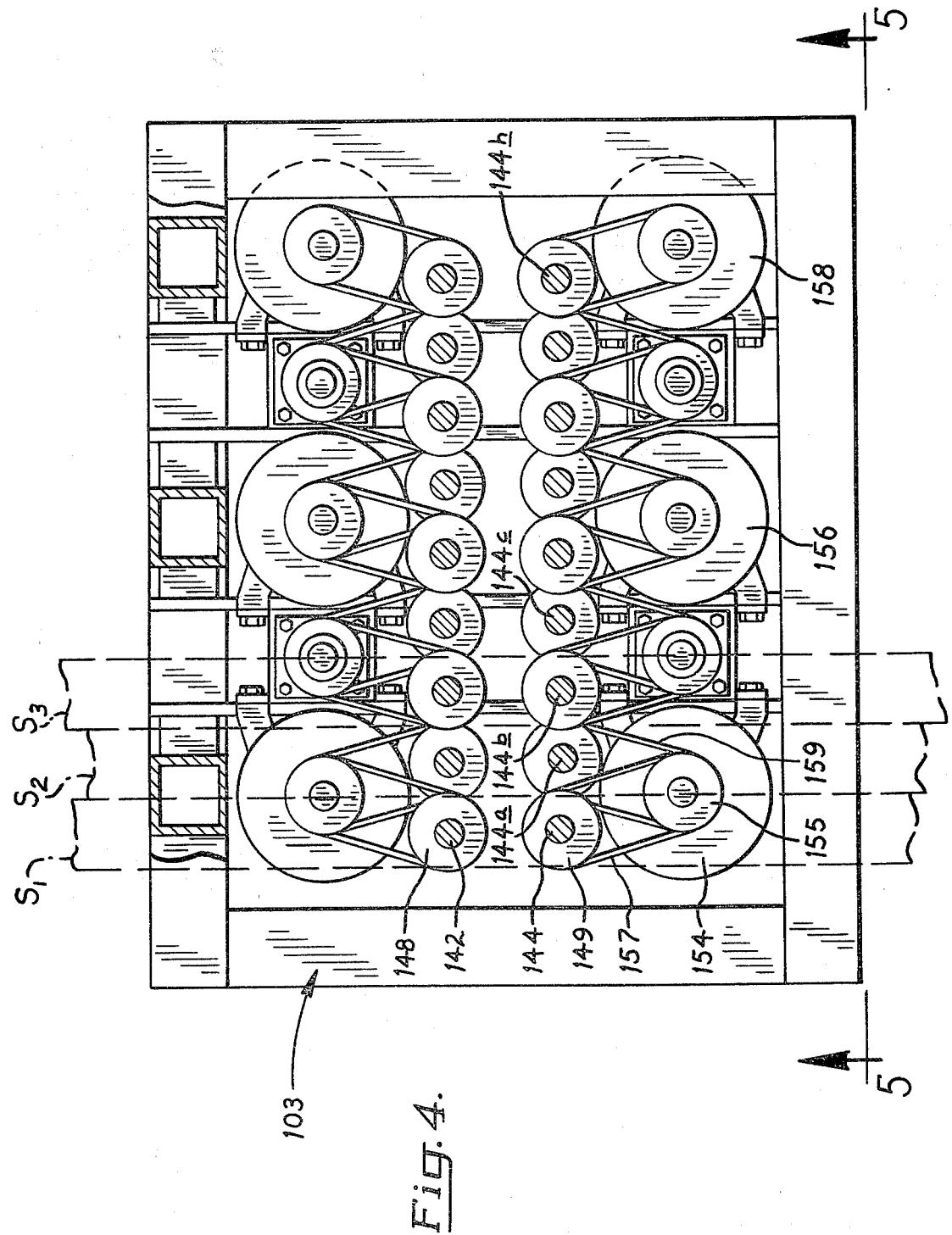
FIG. 4 is a greatly enlarged top plan view of one of the carriage assemblies isolated from the remainder of the apparatus showing mounting of the drilling means in drill sets.
Figure 5:
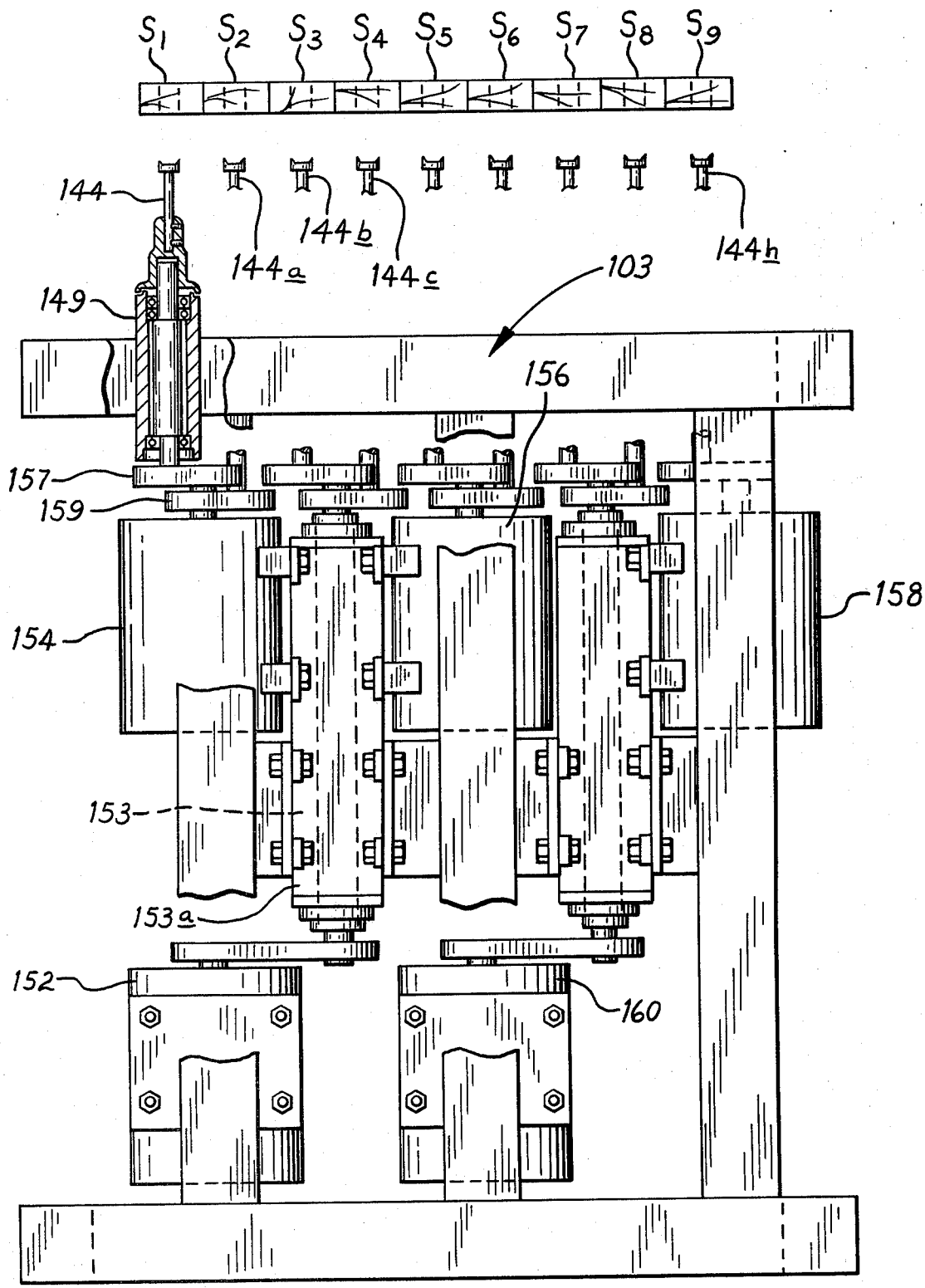
FIG. 5 is an end elevation view taken along lines 5—5 of FIG. 4.

With reference also directed to FIG. 4, which is an isolated top plan view of the carriage assembly, it can be seen that the drills are arranged to form drill sets, each set having nine power-driven aligned drills. As shown in FIG. 2, each drill is coupled to a motor. The motors are indicated at 152-160. It is to be noted that motors 152-160 are rigidly mounted on carriage assembly 103 and are suitably connected by pulleys and drives to the drills. As shown in FIGS. 4 and 5, motor 154 is connected by means of a pulley 155 and belts 157, and 159 to drills 144 and 144a respectively. FIG. 5 more clearly illustrates how a single drive shaft from motor 152 is coupled to pulley 155, which is a dual sheave pulley, for driving belts 57 and 159. Additionally, it can be seen that motor 152, disposed on carriage assembly 103 below motor 152, is connected to a jack shaft 153 extending through a housing 153a for driving drills 144b and 144c.

With respect to driving the drill sets defined by the drills extending in line with drill 142, it can be appreciated that a similar motor and pulley arrangement is provided. The important point to note is that each drill motor is connected by means of a dual sheave pulley to a pair of aligned drills. This construction is necessary when it is realized that drilling must occur along the longitudinal axes of a course of aligned studs, which may be 2×4's. The spacing between the rotational axes of a pair of adjacent drills in a common drill set may therefore approximately 3⅝" which necessitates the dual sheave pulleys provided on the motors and relatively close nesting of the drills. It is to be understood that motor 158 need only drive a single drill, in the arrangement shown.

Turning now to the mechanism for reciprocally vertically shifting the carriage assembly 103, attention is once again directed to FIG. 2 which shows an actuating means, generally indicated at 162 operable for raising and lowering the carriage assembly. More particularly, actuating means 162 includes a fluid actuated cylinder 164 suitably mounted on elongate member 34 which includes an extendible retractable rod 166. Upon suitable extension and retraction of rod 166, the carriage assembly is raised and lowered by means of an interconnected series of rods and links. Explaining further, a shaft 168 is rotatably journaled in upright 64, as well as in the upright immediately therebehind and is connected to a pair of rigidly interconnected and aligned links 170, 172. Link 172, in turn, is connected by means of a rod 174 to a mount such as clevis 176. Clevis 176 is rigidly interconnected to carriage assembly 103. Extending generally at right angles to links 170, 172 is another link 178 which is also rigidly connected to shaft 168. Extending between uprights 62, 64 is a rod 180, one end of which is connected to link 178 and another end connected to a link 182 positioned adjacent upright 62. Link 182 is rigidly connected to a shaft 184 which is rotatably journaled to upright 62. Also rigidly connected to shaft 184 is yet another link 186 from which a downwardly depending rod 188 extends. In turn, rod 188 is secured to another clevis 190 which is rigidly connected to the carriage assembly.

Thus, in order to vertically shift carriage assembly 103, and assuming that it is disposed in a lowered position in FIG. 2, rod 166 is retracted within cylinder 164 by means of a suitable control (not shown). Such retraction imparts forces to the various links and rods to raise the carriage assembly 103. Conversely, upon extending rod 166 and returning it to the position shown in FIG. 2, the carriage assembly will be returned.

Rounding out a description of the carriage assembly, it is also noted that additional air bags, such as indicated at 192, 194 are mounted on the base, such as base member 116 of guide assembly 102. The air bags serve to facilitate raising of the carriage assembly when it is lifted.

Turning now to a description of stabilizing means 100, attention is focused on FIG. 3. The purpose of stabilizing means 100 is to provide an abutting surface against which the upper planar surface of the studs may be urged upon raising of the carriage assembly. As shown in FIG. 3, stabilizing means 100 includes box beam 196 which is suitably apertured for receiving drill bits. Additionally, it can be seen that box beam 196 is provided with a nonmetallic plate 198 also suitably apertured. For instance, and as can be seen from a viewing of FIG. 3, plate 198 is provided with apertures 200, 202 for receiving drills 142, 144 respectively. Of course, additional apertures are located in aligned manner behind apertures 200, 202 at spaced-apart intervals for receiving associated drills.

Box-beam 196 must extend across a course of studs to be drilled so that the upper planar surface of each stud has an abutting surface. Therefore, it is necessary for mounting the box beam on upper beams 30, 32. Additionally, it may be necessary to provide some type of adjustability to the position of the stabilizing means and, therefore, sleeve mounts, such as indicated at 204, 206 are mounted on upper beams 30, 32, respectively (see FIG. 1). As shown in FIG. 1, spaced-apart transversely extending tie-arms 208, 210 interconnect sleeve mounts 204, 206. As shown in FIG. 2, sleeve mounts 204, 206 may be slidably mounted on beams 30, 32, respectively, by means of suitable slide elements as shown. Considering now tie-arm 208, it can be seen that such serves as a mounting for stabilizing means 100 and more particularly for mounting box-beam 196. Extending upwardly from box-beam 196 are a pair of spaced-apart members 212, 214 which are slidably received within retaining channels. More particularly, a pair of retaining channels 216, 218 are shown in FIG. 2 rigidly connected to tie-arm 208 and extending downwardly therefrom. Element 212 is slidably received therewithin and suitable fixing means, for securing element 212 to channels 216, 218 is provided (not shown). Thus, box-beam 196 with its associated plate 198 may be vertically adjusted to any predetermined height above conveying means 94.

Additionally, it is to be noted that there are provided stop means selectively operable for halting or arresting downstream travel of a course of studs adjacent each work station. Elaborating further, and with reference directed to FIG. 1, a stop means is shown indicated generally at 220 (see also FIG. 3) suitably mounted to tie-arm 208. Another stop means is mounted on a tie-arm of the stabilizing means adjacent work station 14. As shown in FIG. 3, stop means 220 includes a fluid-actuated cylinder having an extendible-retractable rod indicated at 224. The rod is vertically movable so that when it is extended, it provides a barrier to further downstream travel of the studs. Retraction of the rod permits continued conveyance.

A last structural feature of the present invention to be considered, prior to a description of operation, is an aligning means for engaging portions of a trailing stud of a course and urging the trailing stud toward remaining studs so that each stud is positioned with its longitudinal axis substantially parallel to the others. The aligning means generally includes clamping members operable for contacting a side of the trailing stud and urging it toward the remaining studs. To this end, and with attention directed to FIG. 1, it can be seen that a fluid-actuated cylinder 226 is mounted on tie-arm 210 (see also FIGS. 2 and 3). An extendible-retractable rod 228 is mounted within the cylinder and is connected to a link 230 which is rigidly connected to a rotatable shaft 234. With respect to the shaft, it can be seen that it extends downwardly from a rotatable mounting on tie-arm 210 and includes at its bottom portion a clamping member 236. Clamping member 236 is rigidly connected to shaft 234. Another link 238, also riidly connected to shaft 234 is shown in phantom lines in FIG. 1 and serves to mount a rod 240 which spans across the length of conveying means 94 from a position adjacent tie-arm 210 to a position adjacent tie-arm 211. Rod 240 is connected to a link 244 which, in turn, is rigidly connected to a rotatable shaft 246 rotatably journaled in tie-arm 211 and downwardly depending therefrom. Adjacent a bottom portion of shaft 246 is a clamping member 248. Thus, upon suitable extension of rod 228 from cylinder 226, clamping members 236, 238 will be biased against the trailing edge of a trailing stud. This will cause the trailing stud to be flexed toward the left, as shown in FIG. 1 so that any bows or warpage will be corrected. This will also align the other studs to that a compact array results.

OPERATION OF THE APPARATUS

Generally describing operation of the apparatus of the present invention, it will be noted that such description will be primarily directed to the sequencing of charging means 96 and stabilizing means 100. However, it is to be appreciated that a similar simultaneous sequence, through suitable controls will be provided adjacent work station 14. The description assumes that it is desired to drill a pair of bores, adjacent each end of a group or course of nine studs. Of course, it is to be understood that a greater or lesser number of studs could be drilled and this description is to be considered only as being exemplary.

Additionally, it is to be noted that the present invention contemplates that first conveying means 79 and second conveying means 94 are to be continuously operated generally at the same rate of delivery. In this connection, it can be considered that first conveying means 79 will accumulate some predetermined number of studs, such as a course of nine from an upstream source, such as a conveyor delivering lumber from, for example, trimmer saws. Suitable lugs (not shown) are provided on the first conveying means for delivering nine studs as a batch to second conveying means 94.

As shown in FIG. 1, a total of nine studs such as indicated at $S_1$–$S_9$ have been delivered from first conveying means 79 to second conveying means 94. Stud $S_1$ is considered to be a leading stud and stud $S_9$ a trailing stud. Initially, the carriage assembly is retractd as shown in FIGS. 2 and 3 and stop means 220 is actuated to extend rod 224 so as to arrest downstream travel of stud $S_1$. This causes studs $S_2$–$S_9$ to gang up. The next step contemplates the alignment of studs $S_1$14 $S_9$ and to this end, cylinder 226 is suitably actuated to extend rod 228 so that clamping members 236, 248 suitably urge the studs together, as shown in FIG. 1. The next step in the sequence, prior to actual drilling of the studs, in the charging of the studs from a prespot position on second conveying means 94 into a charged or clamped position against stabilizing means 100. This is effected by suitable actuation of actuating means 162 so that charging means 96, and in particular carriage assembly 103 is shifted vertically upwardly until upper surface 14a of lift element 141 contacts the bottom surface of the studs. At this point, no drilling has occurred, but the carriage assembly continues to be shifted vertically upwardly with the studs being raised off of second conveying means 94. The carriage assembly continues its upward movement until an upper surface of the studs contacts plate 198 and the studs are clamped thereagainst.

Because air bags 138, 140 are provided, it can be seen that with lift element 141 engaging the course and continuously urging it against the stabilizing means, the carriage assembly may be simultaneously permitted to continue upward movement so that the drills, such as drills 142, 144 continue their upward movement for initiating drilling. The penetrating ends of the drills move above upper surface 141a of lift element 141 because of the inherent collapsability of air bags 138, 140. As the carriage assembly is shifted upwardly, and air bags 138, 140 collapse, the drills penetrate through the studs from the bottom surfaces thereof and up through the apertures provided in plate 198 and box-beam 196. After complete drilling has occurred, actuating means 162 is suitably operated so as to extend rod 166 and thereby lower the carriage assembly and retract the drills. Suitable vaccum means may be interconnected to box-beam 100 for evacuating shavings while some shavings may none the less fall through the apertures and down onto the floor.

After retraction of charging means 96, the stop means are also retracted and the studs may follow a downstream direction of travel to a subsequent operation. Of course, the aligning means is retracted to accommodate introduction of a new course.

From the above description, it should be recognized that the present invention provides a novel method and apparatus for forming or drilling bores in elongate articles such as studs which includes several simple and efficient steps. Lumber is conveyed or transported to a work station or stations and a charging means, such as charging means 96 is operated for isolating a predetermined course of the studs from the conveying means and maintaining the course substantially stationary to permit drilling to be effected. A particular advantage of the present invention resides in the construction of the carriage assembly which is reciprocably shiftable within guide assembly 102. By providing isolating means, such as air bags 138, 140 and lift element 141, acting in cooperation with stabilizing means 100, the course may be stabilized prior to actual drilling. The stabilizing is effected by collapse of air bags 138, 140 which air bags normally bias a surface, such as surface 141a of lift element 141 above the drills.

Another significant advantage of the present invention is the provision of aligning means, which includes the above description of cylinder 226, rod 228 and the associated rods and links selectively operable for engaging portions of a trailing article of the course and urging the trailing article toward the remaining articles so that each is positioned with its longitudinal axis substantially parallel. This is important from the standpoint that it is desired to at least relatively precisely drill bores in approximately the same location on each stud.

While the present invention has been particularly shown and described with reference to the foregoing preferred embodiment, it will be readily understood by those skilled in the art that other changes in form and detail may be made without departing from the spirit and scope of the invention as defined in the appended claims.

It is claimed and desired to secure by Letters Patent:

1. Apparatus for forming bores in articles comprising:
conveying means operable for transporting the articles to a work station;
stop means disposed adjacent said work station selectively operable for arresting downstream travel of the course;
charging means operable for isolating a predetermined course of the articles from said conveying means at said work station and maintaining the course substantially stationary;
drilling means disposed adjacent said work station and beneath the course operable for selective shifting vertically upwardly for drilling bores in the course; and
stabilizing means disposed above said conveying means, said charging means also including lift means selectively operable for engaging and shifting the course upwardly from said conveying means to a position for clamping the course against said staiilizing means.

2. The apparatus of claim 1 wherein said lift means includes a carriage assembly disposed beneath said conveying means adjacent said work station selectively operable for reciprocal vertical shifting to lift the course from said conveying means and returns the course thereto, said drilling means being rigidly mounted on said carriage assembly and movable therewith.

3. The apparatus of claim 2 wherein said carriage assembly is provided with a lift element and mounting means for connecting said lift element to said carriage assembly, said mounting means enabling said lift element to be raised, upon upward shifting of said carriage assembly, to a position whereby said lift element engages the course and continuously clamps it against said stabilizing means while simultaneously permitting subsequent relative shifting of said carriage assembly so that said drilling means bores the articles.

4. The apparatus of claim 3 wherein said mounting means includes resilient means normally biasing an upper surface of said lift element above said drilling means.

5. The apparatus of claim 4 wherein said lift element includes an elongate member dimensioned with a length for spanning substantially entirely beneath the course.

6. The apparatus of claim 5 wherein said mounting means includes fluid pressurized bag means disposed between said elongate member and said carriage assembly.

7. The apparatus of claim 1 further including aligning means disposed above said conveying means adjacent said work station selectively operable for engaging portions of a trailing article of the course and urging the trailing article toward the remaining articles so that the articles are positioned substantially parallel to one another.

8. The apparatus of claim 7 wherein said aligning means includes extendible-retractable means and clamping members, said extendible-retractable means being operably connected to said clamping members for selectively swinging said clamping members between article engaged and disengaged positions.

9. The apparatus of claim 1 wherein said stabilizing means includes a box beam provided with an apertured lower surface aligned with said drilling means for accommodating reception of said drilling means after boring of the course.

10. The apparatus of claim 9 wherein said apertured lower surface is formed of nonmetallic material.

* * * * *